March 18, 1941.  H. A. ORTEGREN ET AL  2,235,084
MACHINE FOR ASSEMBLING ROLLER BEARINGS
Filed Dec. 8, 1937  8 Sheets-Sheet 1

Inventor
Herman A. Ortegren,
Charles C. Howenstine,
By
Attorneys

March 18, 1941.   H. A. ORTEGREN ET AL   2,235,084
MACHINE FOR ASSEMBLING ROLLER BEARINGS
Filed Dec. 8, 1937   8 Sheets-Sheet 3

Inventor
Herman A. Ortegren,
Charles C. Howenstine,
By
Attorneys

March 18, 1941.  H. A. ORTEGREN ET AL  2,235,084
MACHINE FOR ASSEMBLING ROLLER BEARINGS
Filed Dec. 8, 1937  8 Sheets-Sheet 4

Inventor
Herman A. Ortegren,
Charles C. Howenstine,
By
Attorneys

March 18, 1941. H. A. ORTEGREN ET AL 2,235,084
MACHINE FOR ASSEMBLING ROLLER BEARINGS
Filed Dec. 8, 1937 8 Sheets-Sheet 6
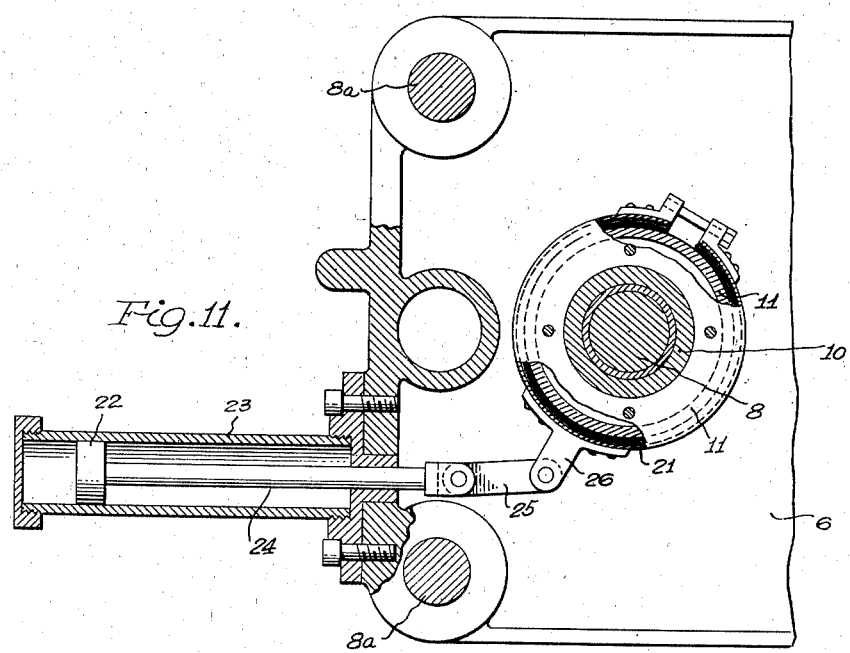
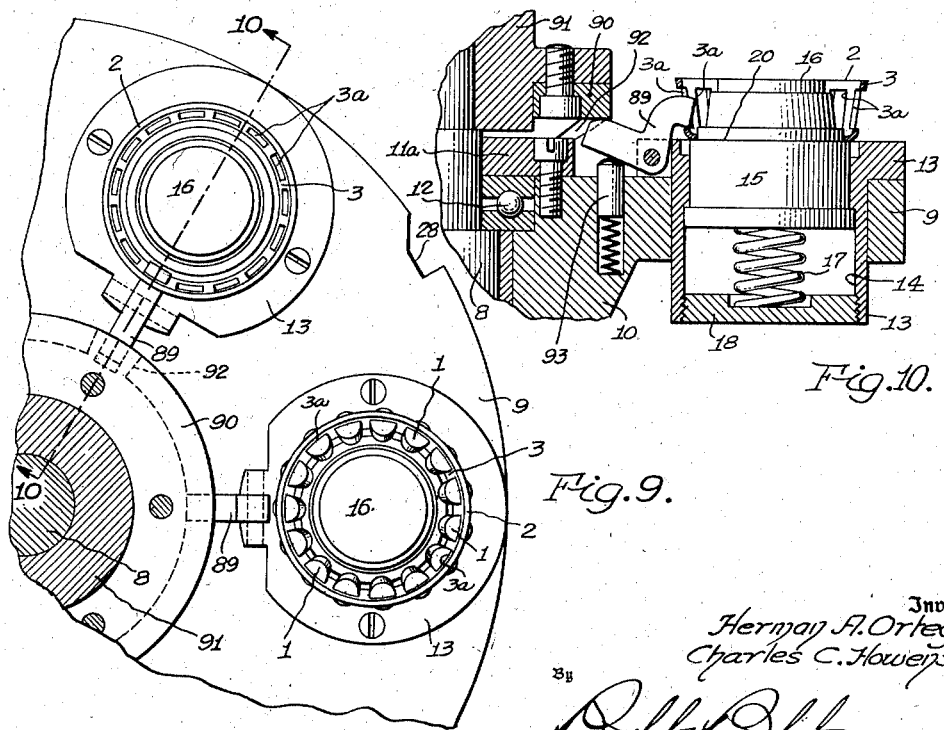
Inventor
Herman A. Ortegren,
Charles C. Howenstine,
By
Attorneys

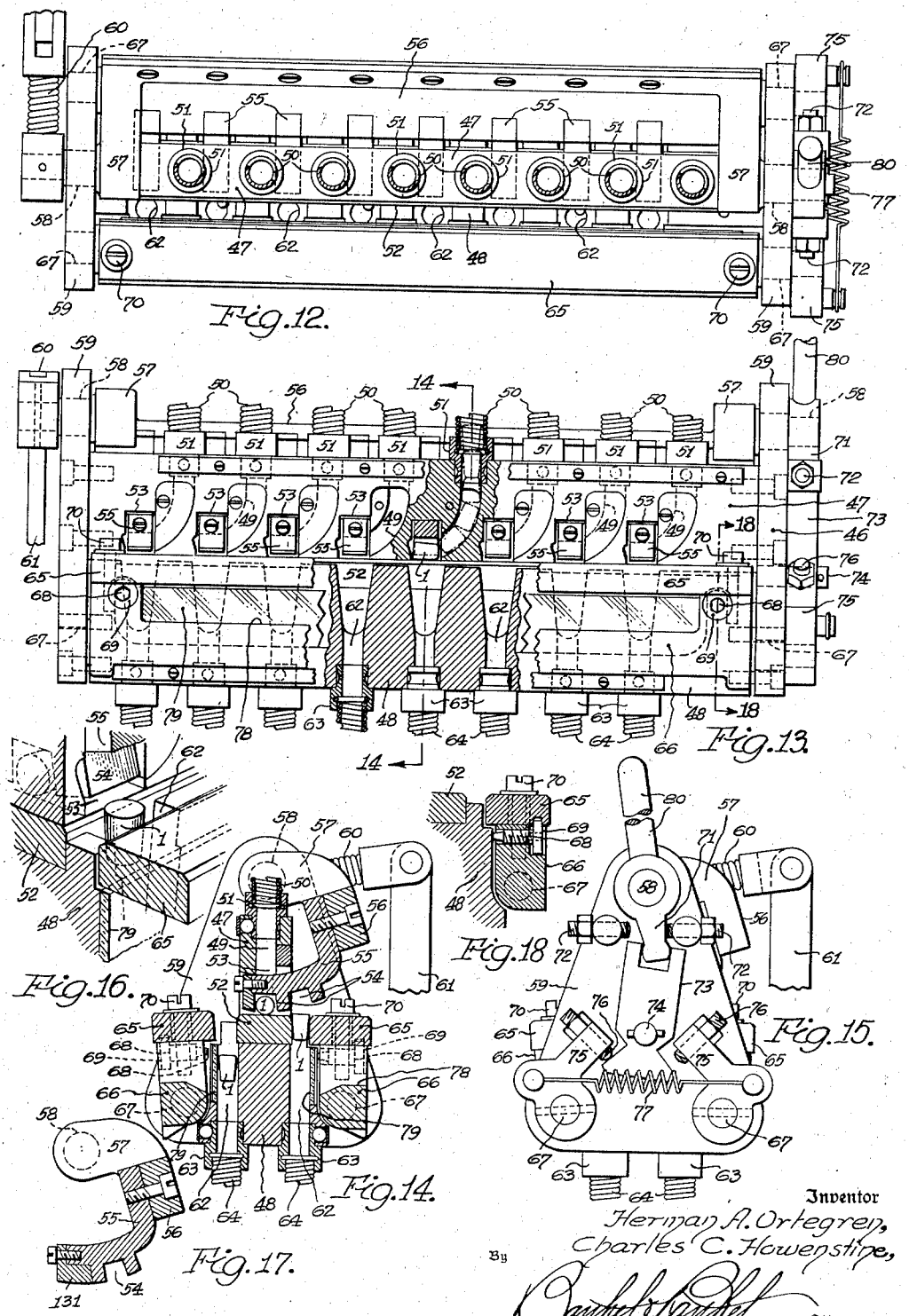

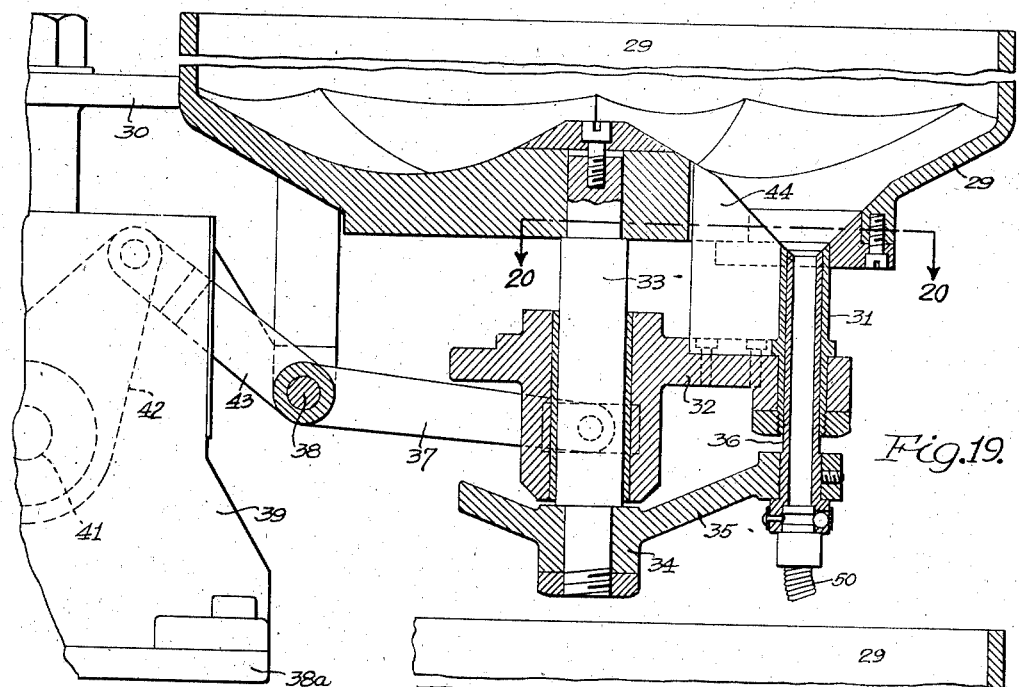
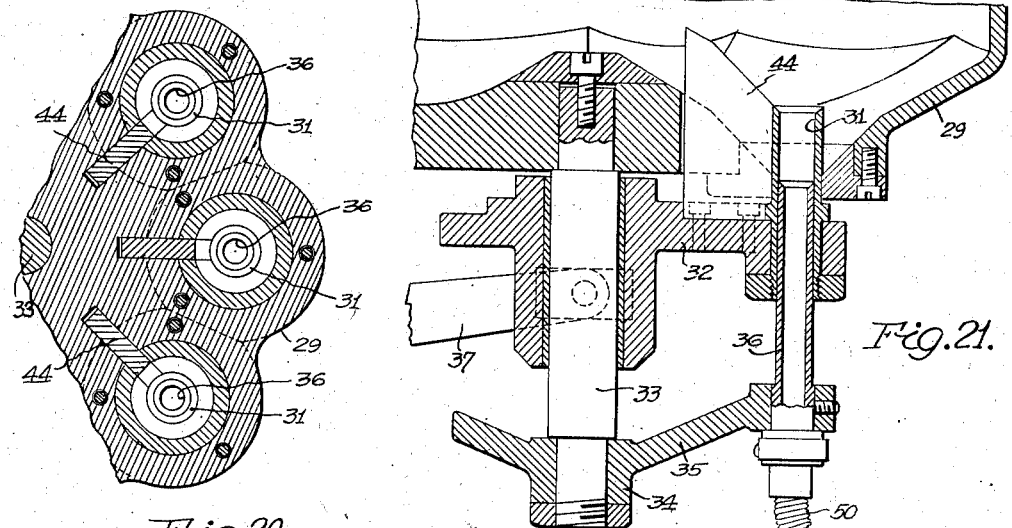

Patented Mar. 18, 1941

2,235,084

UNITED STATES PATENT OFFICE 2,235,084

MACHINE FOR ASSEMBLING ROLLER BEARINGS

Herman A. Ortegren and Charles C. Howenstine, Detroit, Mich., assignors to Bower Roller Bearing Company, Detroit, Mich., a corporation of Michigan Application December 8, 1937, Serial No. 178,784

13 Claims. (Cl. 193—43)

This invention relates to means for use in the assembling of the parts of bearing structures and more particularly to a machine for assembling the rolls and parts of a roller bearing.

An object of the present invention is to provide a machine for automatically handling and assembling the separate pre-formed parts of roller bearings in the commercial production of such bearings, and further to provide the machine with means for automatically feeding rolls from a hopper or other supply of loose rolls and properly positioning a series of these rolls within each roll cage of a series of cages successively and automatically brought, in the operation of the machine, into position to receive each of such series of rolls.

It is also an object to provide such machine with means for automatically inserting within each roll cage after the positioning of the rolls therein a raceway or cone member for the rolls and forcing said member into place within said cage to hold said member and cage assembled with the rolls in place within the cage, thereby completing the assembly.

A further object is to provide a machine especially adapted for assembling the parts of tapered roller bearings and which machine includes means for positioning and feeding tapered rolls with all of the rolls positioned with their ends of least diameter extending in the same direction, and to provide means for automatically locating and positioning each cage relative to said roll feeding means so that each roll will drop into its proper place and position within the cage.

It is also an object to provide a machine having a rotatable table for successively positioning a series of cages and holding the same while the rolls are being positioned therein, together with means for indexing the table around to bring the roll cages successively into position for each to receive a raceway or cone member, the entire operation of assembling the bearing structures in succession being performed automatically.

It is also an object to provide a machine for automatically assembling bearing units each of which comprises a pre-formed cage and a series of rolls, the machine being operative to place the rolls in successive cages and then to form each cage in place into condition to hold the rolls in place within the cage, thereby completing the assembly of the unit.

A further object is to provide certain other new and useful features in the construction, arrangement and combination of parts, all as hereinafter more fully set forth, reference being had to the accompanying drawings in which:

Fig. 9 is a plan view of a portion of the rotary work table;

Fig. 10 is a section substantially upon the line 10—10 of Fig. 9;

Fig. 11 is a section substantially upon the line 11—11 of Fig. 6 with parts broken away and in section to disclose more fully the construction;

Fig. 12 is a plan view of the roll distributing head;

Fig. 13 is a side elevation of Fig. 12 with parts broken away and in section to show the construction;

Fig. 14 is a transverse section substantially upon the line 14—14 of Fig. 13;

Fig. 15 is an elevation of the right hand end of Fig. 13;

Fig. 16 is a sectional perspective detail illustrative of the operation of the roll feeding and positioning means;

Fig. 17 is a sectional detail showing a modified form of the roll feeding member;

Fig. 18 is a cross sectional detail of the adjustable stop and discharging means for the roll positioning means;

Fig. 19 is an enlarged transverse section through the feed hopper substantially upon the line 19—19 of Fig. 4;

Fig. 20 is a sectional detail substantially upon the line 20—20 of Fig. 19;

Fig. 21 is a section similar to that of Fig. 19 with parts shown in a different position to illustrate the operation.

The present machine is designed for the rapid assembly of the parts of a roller bearing and more particularly a bearing employing tapered rolls. Such bearings usually consist of a series of rolls which are spaced apart and held in assembled position by means of what is commonly known as a cage, this cage being of annular form and provided with a series of openings to receive and loosely hold the rolls in place. Such a bearing may also include a cone or raceway member which, when inserted within the cage, holds the rolls in place within the cage.

The machine may, however, be modified for the purpose of assembling bearing units comprising a series of rolls and an annular cage having fingers formed integral therewith and adapted to be bent for loosely holding the rolls in place within the cage.

Figures 6, 7, 8:
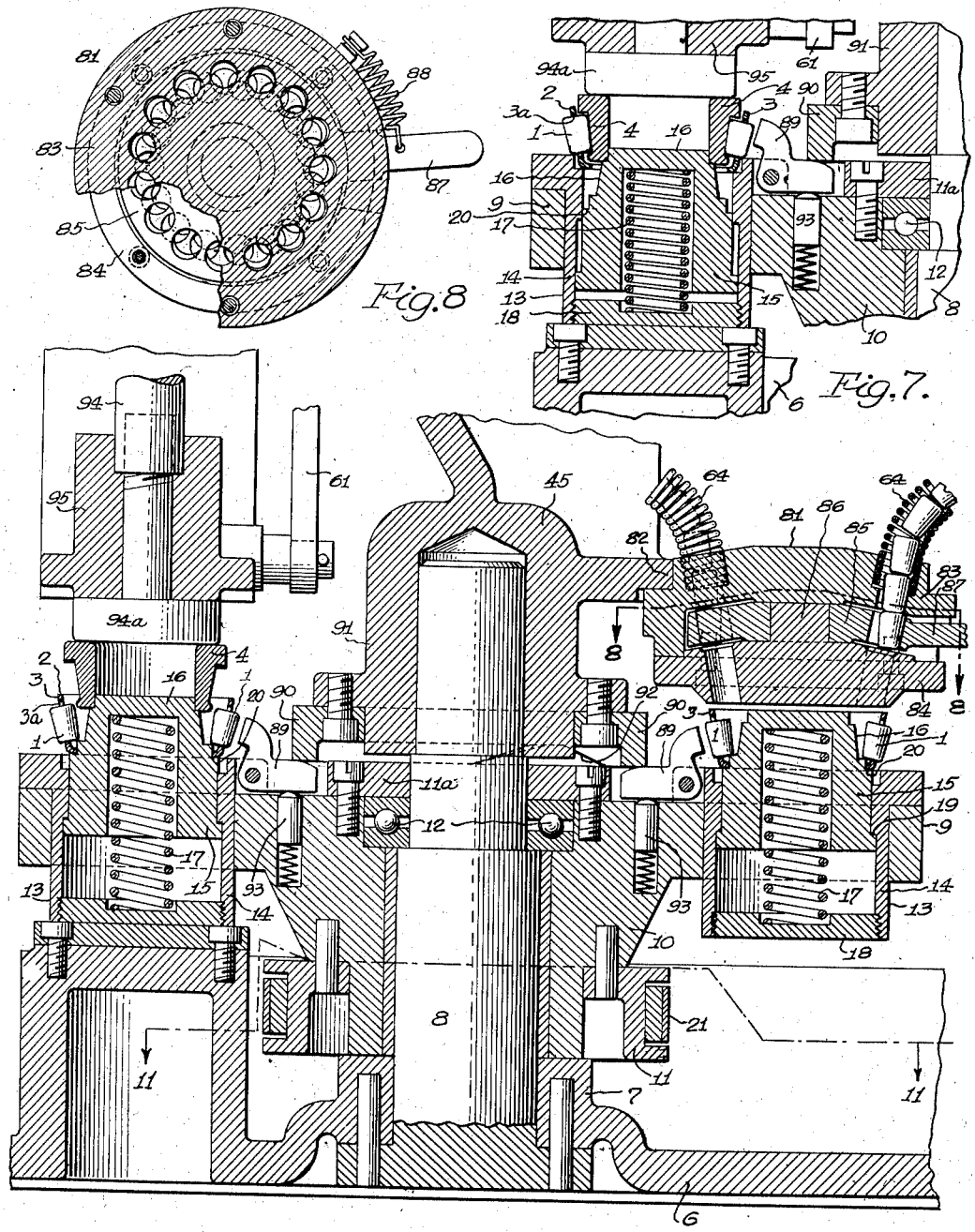
Fig. 6 is an enlarged, longitudinal, vertical section substantially upon the line 6—6 of Fig. 5 and of adjacent parts above.
Fig. 7 is a sectional detail of the cone setting mechanism shown in a different position than that shown at the left side portion of Fig. 6.
Fig. 8 is a sectional detail substantially upon the line 8—8 of Fig. 6.

The bearing as shown in Figs. 6 and 7 comprises a series of tapered rolls 1 and a cage 2 of annular form having an upstanding wall 3 preferably formed of sheet metal with a series of spaced apart openings 3a therein, the width of each opening being slightly less than the diameter of the roll to be received therein. The bearing also includes a conical, annular raceway member 4 having a properly inclined, intermediate portion upon which the rolls are adapted to roll, the cone member being also formed with a rib at its lower end the outside diameter of which is slightly greater than the diameter of the space at the lower ends of the rolls within the cage when the rolls are in position within the several openings in the wall of the cage, so that, when the cone member is forced endwise into the cage after the placing of the rolls in position therein, the lower or small ends of the rolls will be engaged by this rib and will be spread slightly, the cage springing sufficiently to permit the rib to pass the lower ends of the rolls so that the cone will snap into place and loosely hold the rolls in place within the cage, the result being that the rolls, cage and cone are held in properly assembled position.

In the commercial manufacture of such roller bearings, it has been the common practice to insert the rolls into the openings in the cage by hand. This is a slow and tedious process, and it is proposed to do this work by means of a machine automatically operative to select the rolls and guide them into place within the several cages of a series of cages each of which is automatically positioned to receive its proper quota of rolls; and, where the bearing which is being assembled is a tapered roller bearing, the several rolls to be inserted in each cage are fed from a hopper or other supply of loose rolls and are positioned with their ends of smallest diameter all directed in the same direction for properly positioning the rolls within each cage. The parts of each bearing are therefore automatically assembled, it being only necessary for the operator to place the pre-formed cages in the machine, one at a time, and also the cone or raceway members where complete bearings including such members are being assembled.

As shown in the accompanying drawings, the machine embodying the present invention comprises a base 6 formed with a central hub 7 to receive a vertical stud 8 having a head at its lower end by means of which the stud is secured in any suitable manner within the hub 7 in an upstanding, fixed position. Laterally of the hub 7 the base is also formed with openings to receive vertical, fixed, supporting posts 8a for supporting the superstructure of the machine. Mounted for rotation upon the stud 8 is a turn-table indicated as a whole by the numeral 9, and secured in any suitable manner to a downwardly extending hub 10 of this turn-table is a suitable pulley 11 resting upon the upper end of the hub 7 to turn freely thereon, the turn-table being further supported by means of a central disk 11a secured to its upper side in any suitable manner with a ball bearing 12 interposed between this disk 11a and an annular shoulder formed on the stud 8.

The table 9 is formed with a plurality of openings adjacent its periphery each to receive a cage holder and each of which holders is indicated as a whole by the numeral 13.

Each cage holder 13 includes a tube 14 adapted to fit closely within one of the openings in the table 9 and within this tube is a head or plunger 15 having a stepped, conical, upper end portion 16 adapted to project upwardly through the open upper end of the tube 14, it being normally held in this position by means of a coiled spring 17 interposed between the member 15 and a closure 18 for the lower end of the tube, the member 15 being formed with an annular rib at its lower end to engage a shoulder 19 within the tube to limit the upward movement of the plunger. The conical upper end of this plunger is formed to fit closely within the small end of the bearing cage 2, the cage fitting over the conical projection and seating upon a lower step 20 of this conical end, flush with the upper end of the tube 14.

Figure 5:
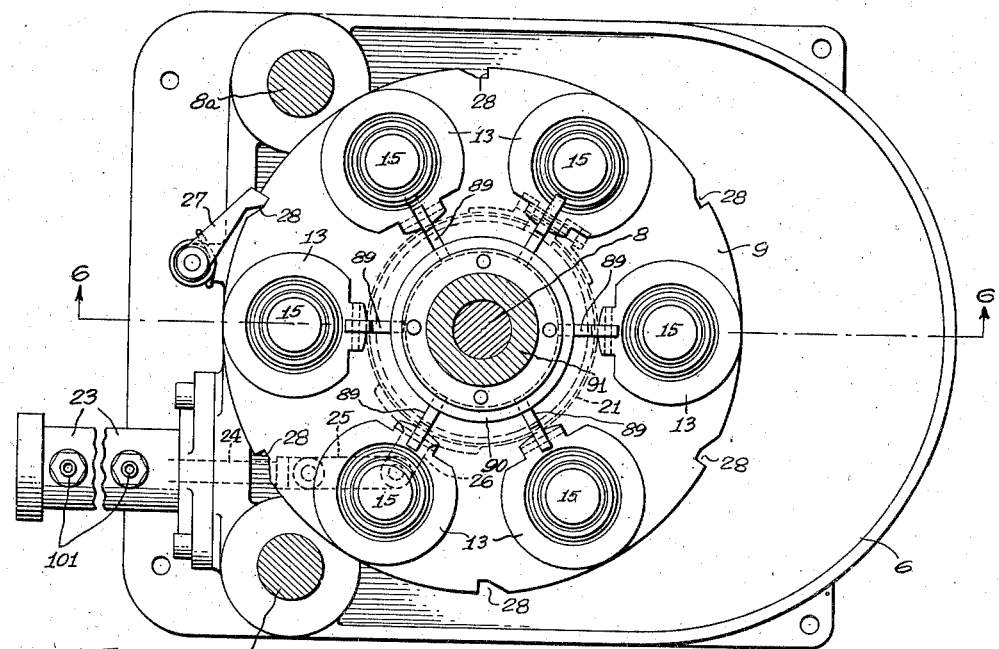
Fig. 5 is a horizontal section substantially upon the line 5—5 of Fig. 2.
Figure 4:
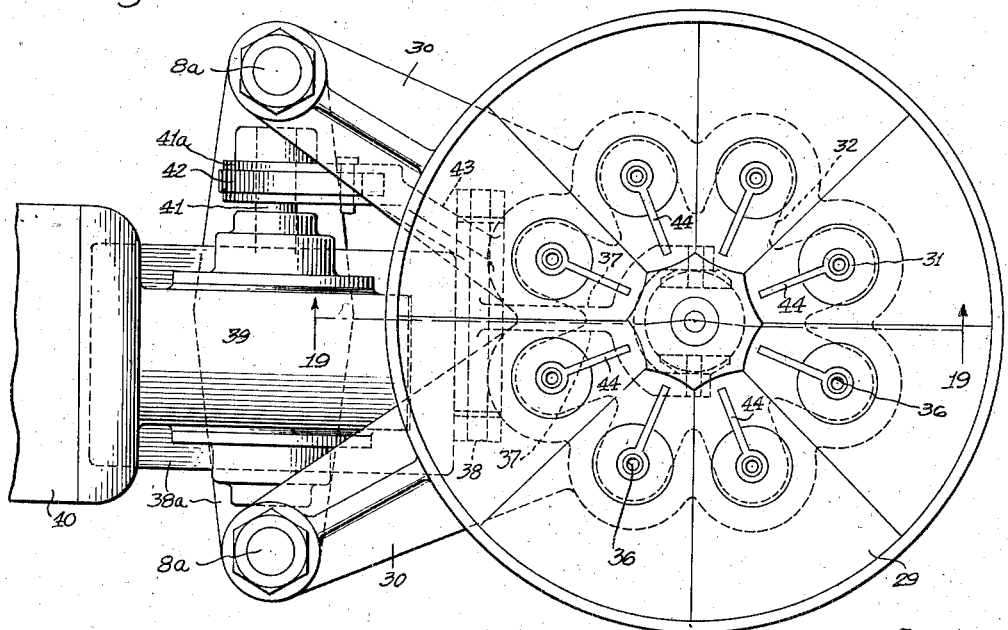
Fig. 4 is a plan view.

Any desired number of these cage holders 13 may be provided upon the table 9 and arranged about the axis of the table to be brought by rotation of the table into position beneath roll feeding means hereinafter described, one at a time; and, while the operator is placing the cage upon one of the cage holders, an adjacent cage is being supplied with rolls, the table being turned by means of a friction band or ring 21 applied to the pulley 11 which is secured to the lower end of the hub 10 of the table 9. This friction band or member 21 is operated in timed relation to the operation of other parts of the machine by means of a plunger 22 movable within a cylinder 23 and having a stem 24 pivotally connected by a link 25 to an arm 26 extending laterally from the friction band 21. Pivotally attached to the frame of the machine in any suitable manner and as shown in Fig. 5 is a spring operated dog 27 adapted to engage the edge of the table 9 and to snap into notches 28 formed at suitable intervals in the edge of the table for properly locating the cage holders 13. Each of the notches 28 is formed with an abrupt shoulder at one side in the direction of the rotation of the table and an inclined shoulder at the opposite side so that the dog 27 will firmly hold the table against backward rotation but will permit its forward rotation by the friction band 21 when said band is operated in one direction by means of the plunger 22, said band slipping in contact with said pulley when turned in the opposite direction, the table being held against backward rotation by said dog 27 engaging the abrupt shoulder of one of the notches.

To supply a plurality of rolls to each cage, a hopper 29 is provided to hold a supply of loose pre-formed rolls, said hopper being provided with radially extending arms 30 to engage the upper reduced ends of the posts 8a, the hopper being thus rigidly and fixedly supported at the upper end of the machine. The lower side or bottom of this hopper is provided with a series of openings arranged concentrically about the axis of the hopper and projecting into each of these openings is a tubular plunger 31, these tubular plungers being mounted within the outer ends of the radial arms of a spider 32 which is mounted for vertical sliding movement upon a central fixed shaft 33 the upper end of which is rigidly secured within an axial opening in the bottom of the hopper and extends downwardly therefrom with its lower end fixed within a fixed spider 34 having radial arms 35 corresponding in number to the arms of the spider 32.

Mounted in any suitable manner within the outer end of each of the arms 35 is a feed tube 36 adapted to slide within the vertical tubular plunger 31 of each of the arms of the movable spider 32, and this movable spider is moved vertically upon the shaft 33 by means of a fork 37 pivotally supported at 38 upon a bracket extending downwardly from the lower side of the hopper 29. A frame member 38a is rigidly supported upon the posts 8a intermediate their ends and upon this frame 38a is mounted a motor support 39 carrying an electric motor 40 from the shaft of which motor motion is transmitted in any suitable manner to a cross shaft 41 to one end of which is secured a cam for operating a crank arm 42 the upper end of which arm is pivotally connected to an extension arm 43 of the fork 37. The movable spider 32 is therefore raised and lowered, sliding upon the shaft 33, by the operation of the electric motor, and this movable spider which carries several tubular plungers 31 will therefore move these plungers upwardly and downwardly within the several openings in the bottom of the hopper. As these plungers 31 are tubular, and as the feed tubes 36 are also tubular and extend into these plungers, the loose rolls within the hopper 29 will feed into the upper open ends of the several tubular plungers 31 and pass down into the feed tubes 36.

The quantity of loose rolls within the hopper is continually agitated by the up and down movements of the tubular plungers 31 so that the rolls find their way into the open upper ends of the plungers; and, to increase the agitation of the rolls within the hopper and direct them into the upper ends of the plungers, an agitator blade 44 is secured at its lower end adjacent each plunger 31 to each arm of the movable spider 32. These blades extend longitudinally of and upwardly beyond the upper ends of these plungers into the bottom of the hopper through radial slots in said bottom. Therefore, as the several plungers are moved upwardly and are projected through the openings in the bottom of the hopper, the blades will also be moved upwardly through their slots in the bottom of the hopper and come into contact with the supply of rolls within the hopper to agitate these rolls so that they will find their way into the upper open ends of the several plungers.

Mounted upon the reduced upper end of the central stud 8 rising from the base of the machine is a supporting frame 45, and rigidly mounted in any suitable manner upon the upper end of this frame 45 is a roll feeding and distributing head indicated as a whole by the numeral 46, said head comprising an upper block or bar 47 of extended length and a lower parallel block 48, the upper block 47 being formed with a series of curved conduits or passages 49 opening through the upper side of said block and equal in number to the number of feed tubes 36 which extend downwardly from the hopper 29. Secured in any suitable manner to the lower end of each of the feed tubes 36 is a flexible conduit 50, these conduits being extended along the head 46 with each of their lower ends secured to a tubular plug 51 secured within a bore in the upper side of the block 47, and which bores form continuations of the upper ends of the curved passages 49 in said block 47. The rolls contained within each of the several feed tubes 36 are thus free to pass into the upper ends of the flexible conduits 50 and down these several conduits and be distributed along the head 46, passing into the upper ends of the several curved passages 49 in the upper block 47 of the head. In passing down each of these curved passages 49, the lowermost roll therein is directed by the curvature of the passage into a horizontal position at the lower end of the passage with the longitudinal axis of this roll extending horizontally and longitudinally of the block 47 adjacent the lower side of said block, where these rolls will then rest upon the upper surface of a horizontal supporting bar forming a shelf 52 which is mounted directly upon the upper side of the lower block 48. The lower end of each curved passage 49 opens into a transverse way or opening 53 in the upper block 47 and each roll, as it passes down and out of the lower end of each of the curved passages 49, passes into one of these openings 53 and will lie therein, in a horizontal position, upon the upper surface of the horizontally extending supporting bar or shelf 52 and within one of a pair of notches 54 formed in the lower side of a feed finger 55 which extends into and through said opening 53. There is one of these feed fingers 55 in each of the openings 53 and they are secured to a swinging feed bar 56 extending the full length of the block 47 at one side thereof and provided with a laterally extending pivot ear 57 at each end. Ears 57 are pivoted as at 58 to end plates 59 at the ends of the head 46 and to which plates or headers 59 the ends of the blocks 47 and 48 are secured in any suitable manner, as by screws passing through the plates and into the ends of the blocks. These fingers 55 are curved in the direction of their lengths concentrically with their pivotal support 58 and therefore are adapted to swing through the several openings 53 transversely of the block 47.

The feed bar 56 is swung in proper timed relation to the operation of other parts of the machine by means of a flexible arm 60 attached to the pivot 56 at one end of the feed bar, and to the outer end of this arm 60 is pivotally connected an operating rod 61 extending downwardly and being pivotally connected at its lower end to movable means hereinafter described for operating other parts of the machine.

As hereinbefore stated each roll, after passing down its curved passage 49 in the block 47, enters one of the openings 53 and lies upon the upper surface of the bar or shelf 52 within one of the notches 54 in one of the feed fingers 55. Therefore, upon swinging movement of the feed bar 56 in either direction, each of the several rolls so positioned will be moved laterally from the supporting shelf 52, dropping out of the respective notch 54 and into the upper open end of one or the other of a pair of vertical slots 62 formed in the opposite sides of the lower block 48, which slots extend downwardly through the block and terminate at their lower ends in round bores into which are secured tubular plugs 63 similar to the plugs 51 and into which plugs the upper ends of tubular flexible conduits 64 are secured.

In assembling tapered roller bearings, it is essential that the several rolls be placed in each cage with the tapers of all rolls extending in the same direction. So as the rolls are free to enter the open upper ends of the feed tubes 36 with either end up, it becomes necessary to reverse those rolls which pass down the conduits 50 with the wrong end up, and, to insure that all rolls will drop into their cages with their ends of greatest diameter up, means are provided, immediately following the ejection of each roll from either side of the shelf 52 by the operation of the feed fingers 55, for turning each roll from the horizontal position in which it drops from said shelf into a vertical position. To accomplish this change of position, each roll drops into a limited space at the upper end of each slot 62 between the edge of shelf 52 and an opposed movable limit bar 65, which space is limited by said bar to a width less than the diameter of the large end of each roll. Therefore, each roll will be engaged at opposite sides adjacent its large end only and suspended between the straight edge of the shelf and straight side of the bar to swing by gravity upon its points of engagement therewith into a vertical position with its end of least diameter extending downward.

Each of the two limit bars 65 is secured upon the upper side of a supporting bar 66 which is pivotally supported at its ends by studs 67 projecting from the ends of the bar adjacent its lower side into openings in the end plates 59. These bars are all adapted to swing toward and from the adjacent sides of the block 48 in which sides the slots 62 are formed, said sides being cut away across the upper ends of said slots to permit the projecting inner side of each limit bar to approach the outer edge of the shelf 52, leaving a space therebetween to receive the rolls. The limit bars are so adjusted that the distance between the inner side of each and the opposed edge of the shelf will be just slightly less than the extreme diameter of the large end of the roll when the limit bar is swung toward said edge to the limit of this movement, as determined by adjustable stop screws 68 passing through screwthreaded openings in each bar 66 adjacent its ends and near its upper side. Each stop screw 68 has a head 69 the periphery of which is engaged within a notch in the lower side of the limit bar 65, and said bar is attached to its supporting bar 66 by screws 70 passing through elongated openings in said limit bar, so that, as said stop screws are screwed inwardly into contact with the block 48, the bar 66 will be swung outwardly and at the same time the limit bar will be moved by said screws toward said block and the edge of shelf 52, thus providing a differential adjustment for said limit bar to give a very accurate adjustment of the width of the space between the edge of said shelf and opposed edge of said limit bar so that the rolls dropping into said space will be caught adjacent their large ends and suspended thereby, thereupon being free to swing within the flared upper end portions of the slots 62 to a vertical position and pass down said slots, when released, into the several conduits 64.

To swing the bars 66 and limit bars 65 carried thereby, at the proper time to release the rolls caught between said limit bars and the shelf 52, an arm 71 is secured to one of the pivot studs 58 for the swinging feed bar 56. This stud projects through its bearing opening in the end plate 59 at the end of the head 46 opposite that at which the other stud 58 is located and to which latter stud the operating arm 60 for swinging the feed bar 56 is attached. Arm 71 extends downwardly between a pair of adjustable stop screws 72 mounted upon end plate 59 to limit the swinging of feed bar 56 in both directions, the lower end of this arm 71 being engaged by a fork 73 which is pivoted at 74 to said end plate 59 and has a lower end portion to swing between the upper free ends of a pair of arms 75 each of which is rigidly secured to the projecting end of one of the pivot studs 67 for each of the bars 66 upon which the limit bars 65 are mounted. The free end of each arm 75 is provided with an adjustable abutment screw 76 to engage the lower end of the fork 73 to adjust the swing of the bars 66, and these arms 75 are yieldingly urged toward each other by a coiled spring 77 connecting said arms to hold one of said screws in contact with said fork, the bar 66 to which the other arm is connected being swung toward the adjacent edge of the shelf 52 with its limit or stop screws 68 in contact with the block 48. The bars 66 are therefore alternately swung in timed relation to the swinging of the feed bar 56 and to the operation of the fingers 55 in ejecting a roll from one edge and then the other of the shelf 52.

In order that the operator of the machine may observe whether or not a roll has been fed to and is suspended in the upper end of each slot 62 just prior to release of the rolls, an opening 78 extending nearly the full length of each of the bars 66 is provided therein, and each opening is closed by a suitable transparent member 79. Therefore, if he should find a roll to be missing from one of these slots 62, he can swing the feed bar 56 by means of a handle 80 on the arm 71 and thus manually feed a roll into that slot.

There is one conduit 50 leading from the hopper 29 to the upper end of each curved passage 49 in the upper part of the head 46 and each of these conduits and passages is kept filled with rolls so that each feed finger 55 swinging through each opening 53 which forms the lower end of each passage may receive a roll in each of its notches 54. When swung, these fingers will alternately deliver rolls into the spaces between the limit bars 65 and edges of shelf 52, first at one side of said shelf and then at the other to supply rolls to both sets of conduits 64, one set leading from the lower ends of the slots or passages 62 in one side of the lower block 48 of the distributing head and the other set leading from the slots at the opposite side of said head. These conduits 64 are together equal in number to the number of rolls to be placed in any one of the cages 2 positioned upon the table 9 with one cage directly below a fixed delivery head indicated as a whole by the numeral 81 and mounted within a forked end of an arm 82 projecting from the frame 45.

This delivery head 81 is of circular form in plan view and comprises an upper disk 83 fitted within the forked end of the arm 82 and secured therein, a lower disk 84 and a recess between said disks within which is a rotatable disk 85 mounted upon an axial stud 86 on said lower disk, all as shown in Fig. 6. These three disks have alignable openings arranged concentrically about the axes of the disks, said openings in the several disks together forming passages through the head when aligned, each passage forming a continuation of one of the conduits 64 the lower ends of which conduits are secured within the upper ends of the openings in the upper disk. The turn table 9 is rotatable with its peripheral portion below the horizontal plane of delivery head 81 to bring the cage holders 13 and cages 2 carried thereby, one at a time, into position directly below said head 81 and into such position that the rolls 1 dropping from the several openings in the lower disk 84 will drop into their proper places in the cage. These passages for the rolls formed by these aligned openings in the disks of the head are inclined downwardly in convergent relation so that the rolls will be inclined outwardly as they drop into the cage and will therefore fall outwardly into the openings 3a in the upstanding wall of the cage.

The conduits 64 are preferably kept substantially filled with rolls so that they will feed down the conduits by gravity, and, to control the discharge of these rolls into the cage, the intermediate disk 85 serves as a valve and is provided with a forwardly projecting handle 87 by means of which it may be turned by hand against the action of a spring 88 which normally holds said disk turned with its openings out of alignment with the openings in the other disks and prevents the feeding of rolls into the cage until such time as the cage is properly positioned and the operator turns the valvular disk to release a set of rolls. The feeding of rolls into the cage is thus controlled independently of the operation of the machine and the operator may see that each cage is filled and the rolls properly positioned therein before the table is turned to the next station.

In operation, the operator will place a cage 2 over the conical end 16 of the plunger 15 of the cage holder 13 next preceding in the direction of rotation of the table 9 the holder which is directly beneath the delivery head 81. To insure proper positioning of the openings 3a in the wall 3 of this cage relative to the discharge openings in the disk 84, a locating dog 89 is pivotally mounted opposite each cage holder 13 within a notch in the edge of a flange of the cage holder at the upper side of the table 9. Each of these dogs has an upstanding free end adapted to enter one of the openings 3a in the wall of the cage as the cage is placed upon said holder, each dog also having a tail portion extending radially inward of said table and beneath a flanged cam ring 90 secured to the lower end of the supporting hub 91 of the frame 45. The lower edge of this ring 90 is formed with a cam notch 92 into which the tail ends of the dogs 89 successively ride as they are carried around by the table 9. This cam notch is located opposite the station where each cage is placed upon its holder so as to permit each of the dogs to tilt about its pivot under the force of a spring operated plunger 93 acting beneath the tail of each dog and to permit the head end of the dog thus tilted to enter one of the openings 3a in the cage just placed. Further turning of the table to position the cage beneath the head 81 will move the tilted dog out of contact with the cam notch and cause said dog to be withdrawn from said opening in the cage to permit a roll to drop into place therein when the rolls are released from said head.

Figure 1:
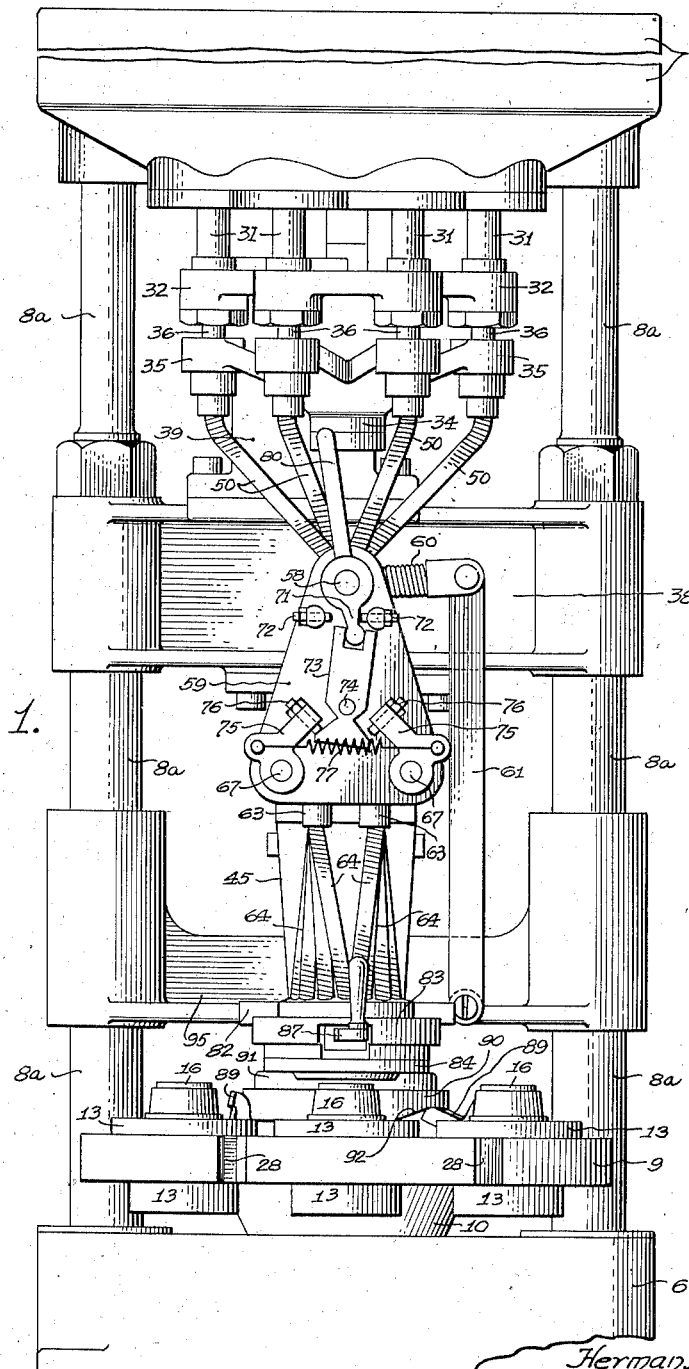
Figure 1 is a front end elevation of a machine illustrative of an embodiment of the present invention.
Figure 2:
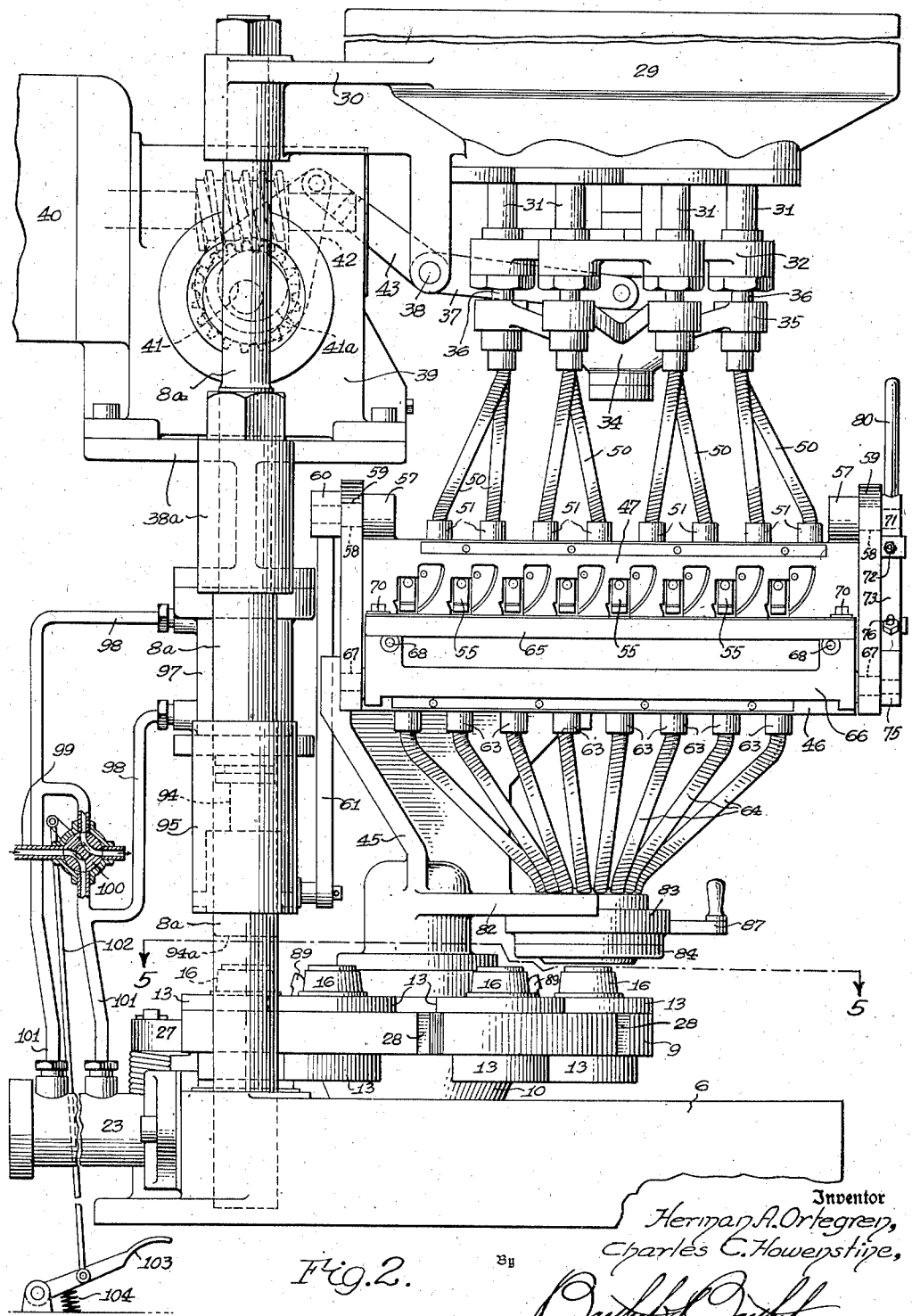
Fig. 2 is an elevation of the left side of the machine.
Figure 3:
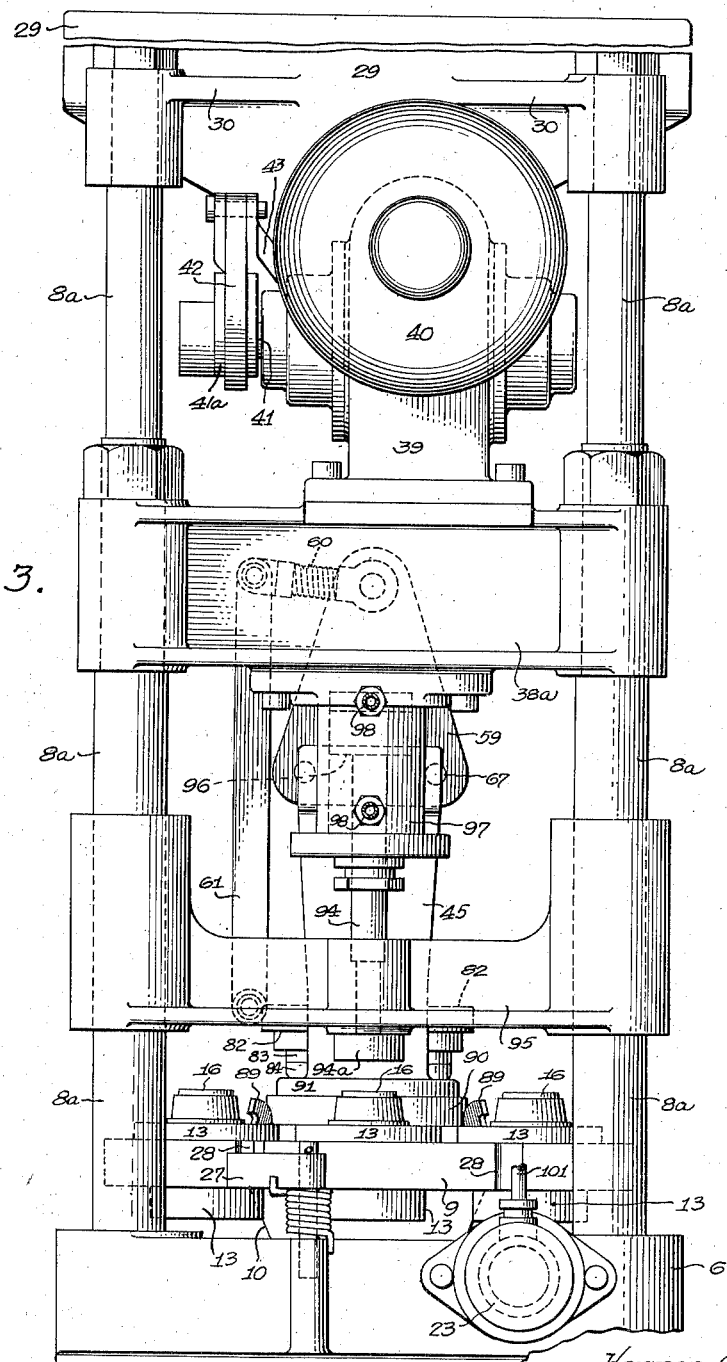
Fig. 3 is an end elevation of the back of the machine.

When a bearing including the conical raceway member 4 is being assembled, this member 4 is placed by the operator in position to be inserted within the cage 2 which has just been supplied with rolls by the delivery head 81 and moved along by the further turning of the table 9, said raceway being seated at its lower end upon the upper step of the conical upper end 16 of the plunger 15, as shown at the left in Fig. 6. The table is then turned to bring the cage and raceway beneath a head 94a on the lower end of a piston rod 94 which lower end is guided by and secured to a bridge bar 95 slidable upon the vertical posts 8a. The lower end of the rod 61 is pivotally attached to the bridge 95 for transmitting motion from said bridge to operate the arm 60 and swing the feed bar 56 for feeding the rollers from the lower ends of the passages 49 in the distributor head 46. The upper end of piston rod is secured to a piston 96 within a cylinder 97 (see Figs. 2 and 3) secured to the lower side of the frame member 38a so that, upon the admission of compressed air or other fluid into said cylinder through one of a pair of branch pipes 98, the piston will be moved to bring the head 94a down upon the upper end of the conical raceway 4 and force said raceway downward together with the plunger 15 upon which it is seated, the plunger moving down within its tube 14 against the action of the spring 17 and said raceway being thus forced into the cage 2 which seats at its lower end within a groove in the upper end of said tube as said plunger moves downward. The raceway is thus forced endwise into its cage, its annular outstanding rib on its lower end being forced past the rolls in said cage to engage beneath their lower ends, thus locking the raceway and rolls in the cage and completing the assembly of the bearing unit.

Upon completion of the bearing assembly and upstroke of the piston rod 94, the assembled unit will be lifted clear of the table 9 by the upward projection of the plunger 15 due to the spring 17 so that the operator may conveniently remove the assembled unit from the machine. The operations of turning the table 9 and operating piston 96 are conveniently controlled by providing a suitable source of fluid under pressure (not shown) from which source a pipe 99 leads to a suitable two way valve 100 (Fig. 2) which controls and alternates the flow to the branch pipes 98 and also to pipes 101 leading to cylinder 23 having therein the piston 22 which operates the friction band 21 for turning said table 9. This valve 100 is operated by a rod 102 leading to a foot pedal 103 beneath which is a spring 104 for returning the pedal and valve to normal position.

It may be found desirable to modify the roll feeding mechanism so that it may feed a lesser number of rolls into each cage, as, for instance, where a lesser number of rolls with greater interspacing is used. To do this, the feeding of rolls by one or more of the fingers 55 at one side of the head 46 is prevented by closing one of the notches 54 by means of a detachable block 131, as shown in Fig. 17. It is obvious that other changes may be made in the construction, arrangement and combination of parts without departing from the spirit of the invention and we do not therefore limit ourselves to the particular construction shown.

What we claim is:

1. A machine for the purpose described including a roll feeding and distributing head adapted to receive and position a series of rolls with the like ends of said rolls all directed in the same direction, said head including an upper block formed with a series of curved passages opening through the upper side of said block to receive rolls by gravity and opening at their lower ends into transverse openings opening through opposite sides of said block, a lower block formed with vertical slots at each side of said block, movable members extending throughout the length of said lower block in opposed relation to the opposite sides of said block and said slots therein and spaced therefrom to form a longitudinal slot at each side of said lower block to receive rolls ejected from the ends of said transverse openings in said upper block, means for moving said movable members toward and from opposite sides of said lower block to engage rolls ejected into said slots and suspend said rolls in said slots adjacent their ends of largest diameter whereby all of said rolls so engaged may swing upon their points of contact with said movable members and said lower block with their ends of smallest diameter all directed downwardly, means for feeding said rolls from said openings in the lower side of said upper block, said means comprising a feed bar at one side of said upper block, which feed bar is formed with a series of fingers to project into and through said transverse openings, means for pivotally supporting said feed bar, an arm secured to an end of said feed bar, means for pivotally supporting each of said movable members for engaging said rolls, an arm secured to each of said movable members to move said members toward and from said lower block by the swinging movement of said arm secured to said feed bar, and means for swinging said feed bar on its pivotal support and thereby swinging said members in opposed relation to opposite sides of said lower block, in timed relation to the swinging movement of said feed bar.

2. A machine for the purpose described including a roll feeding and distributing head adapted to receive and position a series of rolls with like ends of said rolls all directed in the same direction, said head including an upper block of extended length formed with a series of passages opening through the upper side of said block and opening into transverse openings in the lower side of said block which openings open through opposite sides of said block, a lower block, a limit bar at each side of said lower block each forming a longitudinal slot between said limit bar and said lower block, each limit bar being pivotally supported at its ends for swinging movement toward and from said lower block to engage rolls received in said slots and suspend said rolls therein for swinging movement upon their points of engagement at opposite sides of each roll with said limit bars and lower block, an arm secured to each limit bar at one end to swing the same, a feed bar extending adjacent one side of said upper block and pivotally supported at each end by pivot means, fingers upon said feed bar to project into and through said transverse openings at the lower side of said upper block, an arm secured to said pivot means for said feed bar at one end thereof, a fork pivotally supported intermediate its ends with said fork engaged with said arm secured to said feed bar and with the lower end of said fork adapted to engage first one and then the other of said arms for swinging said limit bars to operate said limit bars in timed relation to the swinging movement of said feed bar, means for swinging said feed bar, and a spring connecting said arms for swinging said limit bars and adapted to hold one or the other of said arms for operating said limit bars in contact with said lower end portion of said fork.

3. In a machine of the character described and having a device comprising, a distributing head member defined on one of its sides by a wall, a delivery duct formed in said member in communication with a source of supply of articles distributable by said member and providing an outlet for the articles from said source, a second delivery duct formed in said member in communication with said first duct and extending through said wall for providing an outlet for the articles from said first duct, a third delivery duct formed in said member in communication with said second duct for providing an outlet for the articles from said second duct, means movable between predetermined limits for displacing the articles individually from said first duct through said second duct into said third duct, means movable at predetermined intervals in opposite directions toward and away from said wall for varying the area of said third duct to control the discharge of the articles through said third duct, means normally urging said second means in one of said directions and opposing movement thereof in the opposite of said directions, and oscillatable means operatively interconnecting said first and second means for driving the one by the other between said limits at said intervals.

4. In a machine of the character described and having a device comprising, a distributing head member defined on two of its sides by a pair of walls, a delivery duct formed in communication with a source of supply of articles distributable by said member and providing an outlet for the articles from said source, a second delivery duct formed in communication with said first duct and extending through said walls for providing an outlet at each end of said second duct for the articles from said first duct, a pair of third delivery ducts formed each in communication with one of said last mentioned outlets for providing an outlet for the articles from said second duct, feeder means communicable with said second duct and movable at predetermined intervals in one direction for displacing one of the articles from said second duct through one of said outlets provided thereby and in another direction for displacing another of the articles from said second duct through the other of said outlets provided thereby, means arranged in lateral spaced relation to each of said walls adjacent each of said outlets therein and movable in opposite directions toward and away from said walls in predetermined relation to the movements of said feeder means for varying the inlet areas of said third ducts, and means normally urging said second means in one of said opposite directions and opposing movement thereof in the other of said opposite directions.

5. In a machine of the character described and having a device comprising, a distributing head member defined on one of its sides by a wall, a delivery duct formed in said member in communication with a source of supply of articles distributable by said member and providing an outlet for the articles from said source, a second delivery duct formed in said member in communication with said first duct and extending through said wall for providing an outlet for the articles from said first duct, a third delivery duct formed in said member in communication with said second duct for providing an outlet for the articles from said second duct, means extending through said wall into said second duct and movable between predetermined limits for displacing the articles individually from said first duct through said second duct into said third duct, means movable at predetermined intervals toward and away from said wall for varying the area of said third duct to control the discharge of the articles through said third duct, and oscillatable means operatively connecting said last means with said next to last means for driving the one by the other between said limits at said intervals.

6. In a machine of the character described and having a device comprising, block means defined on one of its sides by a wall, a delivery duct formed in said means in communication with a source of supply of anti-friction bearing elements for providing an outlet for the elements from the source thereof, a second delivery duct formed in said means in communication with said first duct and extending through said wall for providing an outlet for the elements from said first duct, a third delivery duct formed in said means in communication with said second duct for providing an outlet for the elements from said second duct, means carried in said second duct and movable between predetermined limits for controlling the discharge of elements from said first duct into said third duct, means for varying the area of said third duct at predetermined intervals for controlling the discharge of the elements therethrough, oscillatable means operatively interconnecting said first and second means for driving one by the other between said limits at said intervals, and means formed in said first and second means for rendering visible the presence of the elements in said third duct.

7. In a machine of the character described and having a device comprising, a distributing head member defined on two of its sides by a pair of walls, a delivery duct formed in said member in communication with a source of supply of articles distributable by said member and providing an outlet for the articles from said source, a second delivery duct formed in said member in communication with said first duct and extending through said walls for providing an outlet at each end of said second duct for the articles from said first duct, a pair of third delivery ducts formed in said member each in communication with one of said last mentioned outlets for providing an outlet for the articles from said second duct, feeder means carried in said second duct and movable at predetermined intervals in one direction for displacing one of the articles from said second duct through one of said outlets provided thereby and in another direction for displacing another of the articles from said second duct through the other of said outlets provided thereby, and means arranged in lateral spaced relation to each of said walls adjacent each of said outlets therein and movable toward and away from said walls in predetermined relation to the movements of said feeder means for varying the inlet areas of said third ducts.

8. In a machine of the character described and having a device comprising, a distributing head member defined on two of its sides by a pair of walls, a delivery duct formed in said member in communication with a source of supply of articles distributable by said member and providing an outlet for the articles from said source, a second delivery duct formed in said member in communication with said first duct and extending through said walls for providing an outlet at each end of said second duct for the articles from said first duct, a pair of third delivery ducts formed in said member each in communication with one of said last mentioned outlets for providing an outlet for the articles from said second duct, feeder means carried in said second duct and movable at predetermined intervals in one direction for displacing one of the articles from said second duct through one of said outlets provided thereby and in another direction for displacing another of the articles from said second duct through the other of said outlets provided thereby, means arranged in lateral spaced relation to each of said walls adjacent each of said outlets therein and movable between predetermined limit positions with respect to said walls toward and away therefrom in predetermined relation to the movements of said feeder means for varying the inlet areas of said third ducts, and means operable for selectively adjusting said limit positions.

9. In a machine of the character described and having a device comprising, a distributing head member defined on two of its sides by a pair of walls, a delivery duct formed in said member in communication with a source of supply of articles distributable by said member and providing an outlet for the articles from said source, a second delivery duct formed in said member in communication with said first duct and extending through said walls for providing an outlet at each end of said second duct for the articles from said first duct, a pair of third delivery ducts formed in said member each in communication with one of said last mentioned outlets for providing an outlet for the articles from said second duct, feeder means carried in said second duct and movable at predetermined intervals in one direction for displacing one of the articles from said second duct through one of said outlets provided thereby and in another direction for displacing another of the articles from said second duct through the other of said outlets provided thereby, a pair of block elements each supported adjacent one of said walls for movement toward and away therefrom in predetermined relation to the movements of said feeder means, and a second pair of block elements each supported by one of said elements of said first pair for movement therewith and cooperable with the inlet of one of said third ducts for varying the area thereof in accordance with said movement.

10. In a machine of the character described and having a device comprising, a distributing head member defined on two of its sides by a pair of walls, a delivery duct formed in said member in communication with a source of supply of articles distributable by said member and providing an outlet for the articles from said source, a second delivery duct formed in said member in communication with said first duct and extending through said walls for providing an outlet at each end of said second duct for the articles from said first duct, a pair of third delivery ducts formed in said member each in communication with one of said last mentioned outlets for providing an outlet for the articles from said second duct, feeder means carried in said second duct and movable at predetermined intervals in one direction for displacing one of the articles from said second duct through one of said outlets provided thereby and in another direction for displacing another of the articles from said second duct through the other of said outlets provided thereby, a pair of block elements each supported adjacent one of said walls for movement toward and away therefrom in predetermined relation to the movements of said feeder means, a second pair of block elements each supported by one of said elements of said first pair for movement therewith and cooperable with the inlet of one of said third ducts for varying the area thereof in accordance with said movement, and adjustment means carried by each unit of two of said block elements for selectively adjusting the relative positions of said elements of said units.

11. In a machine of the character described and having a device comprising, a distributing head member defined on two of its sides by a pair of walls, a delivery duct formed in said member in communication with a source of supply of articles distributable by said member and providing an outlet for the articles from said source, a second delivery duct formed in said member in communication with said first duct and extending through said walls for providing an outlet at each end of said second duct for the articles from said first duct, a pair of third delivery ducts formed in said member each in communication with one of said last mentioned outlets for providing an outlet for the articles from said second duct, feeder means mounted on an oscillatable support for carriage within said second duct and movement between predetermined limit positions first in one direction for displacing one of the articles from said second duct through one of said outlets provided thereby and then in another direction for displacing another of the articles from said second duct through the other of said outlets provided thereby, a pair of block means mounted on oscillatable supports laterally of said walls for movement toward and away therefrom between predetermined limit positions for varying the inlet areas of said third ducts, driven members carried by said second mentioned supports for movement therewith, a drive member carried by said first mentioned support for movement therewith, and means arranged between said drive and driven members and driven by said drive member for alternately driving said driven members between limit positions corresponding to said second mentioned limit positions and in response to movement of said feeder means between said first mentioned limit positions.

12. In a machine of the character described and having a device comprising, a distributing head member defined on two of its sides by a pair of walls, a delivery duct formed in said member in communication with a source of supply of articles distributable by said member and providing an outlet for the articles from said source, a second delivery duct formed in said member in communication with said first duct and extending through said walls for providing an outlet at each end of said second duct for the articles from said first duct, a pair of third delivery ducts formed in said member each in communication with one of said last mentioned outlets for providing an outlet for the articles from said second duct, feeder means carried in said second duct and movable between predetermined limits in one direction for displacing one of the articles from said second duct through one of said outlets provided thereby and in another direction for displacing another of the articles from said second duct through the other of said outlets provided thereby, means arranged in lateral spaced relation to each of said walls adjacent each of said outlets therein and movable at predetermined intervals toward and away from said walls for varying the inlet areas of said third ducts to control the discharge of the articles therethrough, and oscillatable means operatively interconnecting said first and second means for driving one by the other between said limits at said intervals.

13. In a machine of the character described and having a device comprising, a distributing head member defined on two of its sides by a pair of walls, a delivery duct formed in said member in communication with a source of supply of articles distributable by said member and providing an outlet for the articles from said source, a second delivery duct formed in said member in communication with said first duct and extending through said walls for providing an outlet at each end of said second duct for the articles from said first duct, a pair of third delivery ducts formed in said member each in communication with one of said last mentioned outlets for providing an outlet for the articles from said second duct, feeder means carried in said second duct and movable between predetermined limits in one direction for displacing one of the articles from said second duct through one of said outlets provided thereby and in another direction for displacing another of the articles from said second duct through the other of said outlets provided thereby, means arranged in lateral spaced relation to each of said walls adjacent each of said outlets therein and movable at predetermined intervals toward and away from said walls for varying the inlet areas of said third ducts to control the discharge of the articles therethrough, oscillatable means operatively interconnecting said first and second means for driving one by the other between said limits at said intervals, and means operable for selectively adjusting said limit positions.

HERMAN A. ORTEGREN.
CHARLES C. HOWENSTINE.